US012680605B2

(12) United States Patent
Maeda et al.

(10) Patent No.: US 12,680,605 B2
(45) Date of Patent: Jul. 14, 2026

(54) LUBRICANT THROUGH HOLE FOR TRANSMISSION

(71) Applicant: JATCO Ltd, Fuji (JP)

(72) Inventors: Atsushi Maeda, Hadano (JP); Akira Suwabayashi, Isehara (JP); Minoru Shoichi, Hiratsuka (JP); Hiroki Uehara, Hadano (JP); Akira Kamiyama, Sagamihara (JP)

(73) Assignee: JATCO Ltd, Fuji (JP)

( * ) Notice: Subject to any disclaimer, the term of this patent is extended or adjusted under 35 U.S.C. 154(b) by 31 days.

(21) Appl. No.: 18/873,587

(22) PCT Filed: May 12, 2023

(86) PCT No.: PCT/JP2023/017854
§ 371 (c)(1),
(2) Date: Dec. 10, 2024

(87) PCT Pub. No.: WO2023/243277
PCT Pub. Date: Dec. 21, 2023

(65) Prior Publication Data
US 2025/0361933 A1     Nov. 27, 2025

(30) Foreign Application Priority Data
Jun. 13, 2022     (JP) ................................. 2022-095081

(51) Int. Cl.
*F16H 57/04*          (2010.01)
*F16H 1/20*           (2006.01)
(52) U.S. Cl.
CPC ........... *F16H 57/0494* (2013.01); *F16H 1/20* (2013.01); *F16H 57/0424* (2013.01); *F16H 57/0457* (2013.01); *F16H 57/0476* (2013.01)

(58) Field of Classification Search
CPC ............ F16H 57/0494; F16H 57/0424; F16H 57/0457; F16H 57/0453
See application file for complete search history.

(56) References Cited

U.S. PATENT DOCUMENTS 7,984,791 B2 *   7/2011   Taguchi ............... F16H 57/0483
                                                184/6.12
8,534,425 B2 *   9/2013   Jabs ..................... F16H 57/0447
                                                184/11.1

(Continued)

FOREIGN PATENT DOCUMENTS

EP          4 011 680 B1     5/2024
EP            4394210 A1 *   7/2024   ............... B60K 1/00
WO      WO-2021/131204 A1   7/2021

*Primary Examiner* — Michael A Riegelman
(74) *Attorney, Agent, or Firm* — Foley & Lardner LLP

(57)          ABSTRACT

The unit includes a housing configured to house oil, a rotating electric machine, a first gear connected downstream of the rotating electric machine, a second gear meshing with the first gear, a third gear connected downstream of the second gear, a fourth gear meshing with the third gear, a fifth gear connected downstream of the fourth gear, and a sixth gear meshing with the fifth gear. The rotating electric machine and the first gear are disposed on a first axis. The second gear and the third gear are disposed on a second axis. The fourth gear and the fifth gear are disposed on a third axis. The sixth gear is disposed on a fourth axis. When viewed in an axial direction, the first axis and the fourth axis are disposed in a lower side of the second axis and the third axis.

8 Claims, 4 Drawing Sheets

(56)            References Cited

U.S. PATENT DOCUMENTS

| | | | | |
|---|---|---|---|---|
| 11,448,305 | B2 * | 9/2022 | Engerman | F16H 57/037 |
| 11,525,505 | B2 * | 12/2022 | Vincon | F16H 57/0495 |
| 11,739,819 | B2 * | 8/2023 | Uehara | F16H 37/082 |
| | | | | 475/150 |
| 2011/0192245 | A1 * | 8/2011 | Shioiri | F16H 57/0423 |
| | | | | 74/467 |
| 2018/0163846 | A1 * | 6/2018 | Ahn | F01M 11/02 |
| 2019/0249765 | A1 * | 8/2019 | Ito | B60K 1/00 |
| 2019/0291563 | A1 * | 9/2019 | Ogino | B60K 6/365 |
| 2022/0082166 | A1 * | 3/2022 | Vincon | B60K 1/02 |
| 2022/0136601 | A1 * | 5/2022 | Uehara | B60K 1/00 |
| | | | | 475/150 |
| 2022/0163105 | A1 * | 5/2022 | Engerman | F16H 57/021 |
| 2022/0196149 | A1 * | 6/2022 | Uehara | F16H 57/02 |
| 2022/0348234 | A1 * | 11/2022 | Fiala | F16H 57/0018 |
| 2024/0102544 | A1 * | 3/2024 | Kobayashi | F16H 48/40 |
| 2024/0181871 | A1 * | 6/2024 | Yanagihara | B60K 17/12 |
| 2024/0229921 | A1 * | 7/2024 | Kosaka | H02K 5/203 |
| 2024/0288062 | A1 * | 8/2024 | Uehara | F16H 57/0424 |
| 2024/0313615 | A1 * | 9/2024 | Kosaka | F16H 57/0483 |
| 2025/0183750 | A1 * | 6/2025 | Tanaka | H02K 9/19 |
| 2025/0361933 | A1 * | 11/2025 | Maeda | F16H 1/20 |
| 2025/0368020 | A1 * | 12/2025 | Maeda | B60K 1/00 |
| 2026/0005584 | A1 * | 1/2026 | Maeda | H02K 11/0094 |

* cited by examiner

LUBRICANT THROUGH HOLE FOR TRANSMISSION

TECHNICAL FIELD

The present invention relates to a unit.

BACKGROUND ART

Patent Document 1 discloses a vehicle drive device including a counter gear mechanism for reducing a speed. The vehicle drive device transmits output torque of a rotating electric machine to a pair of wheels via a pair of output members to run the vehicle.

PRIOR ART DOCUMENT

Patent Document

Patent Document 1: WO 2021/131204

SUMMARY OF INVENTION

A rotating electric machine can be used in combination with a power transmission mechanism such as a reduction mechanism or a differential gear. However, if the rotating electric machine and the power transmission mechanism are not unitized and are provided separately, an efficient layout cannot be achieved, and as a result, an overall size may become large. Therefore, a unit with high layout properties is desired.

The present invention has been made in consideration of such a problem, and an object thereof is to improve layout properties of a unit.

A unit according to an aspect of the present invention includes a housing configured to house oil, a rotating electric machine, a first gear connected downstream of the rotating electric machine, a second gear meshing with the first gear, a third gear connected downstream of the second gear, a fourth gear meshing with the third gear, a fifth gear connected downstream of the fourth gear, and a sixth gear meshing with the fifth gear. The rotating electric machine and the first gear are disposed on a first axis. The second gear and the third gear are disposed on a second axis. The fourth gear and the fifth gear are disposed on a third axis. The sixth gear is disposed on a fourth axis. When viewed in an axial direction, the first axis and the fourth axis are disposed at a lower side of the second axis and the third axis.

According to this aspect, by increasing the number of gear stages, a diameter of each gear can be made smaller to achieve a predetermined gear ratio. As a result, a factor of layout constraints caused by excessively large gears can be alleviated. Therefore, layout properties of the unit can be improved. In addition, by concentrating the first axis and the fourth axis on a lower side in a direction of gravity, it becomes easier to guide the oil scattered by rotation of the sixth gear, which is a gear on the downstream side, to a rotating electric machine side as described above. Therefore, a layout that allows for appropriate oil lubrication is achieved.

DESCRIPTION OF EMBODIMENTS

Hereinafter, embodiments of the present invention will be described with reference to the accompanying drawings.

Figure 1:
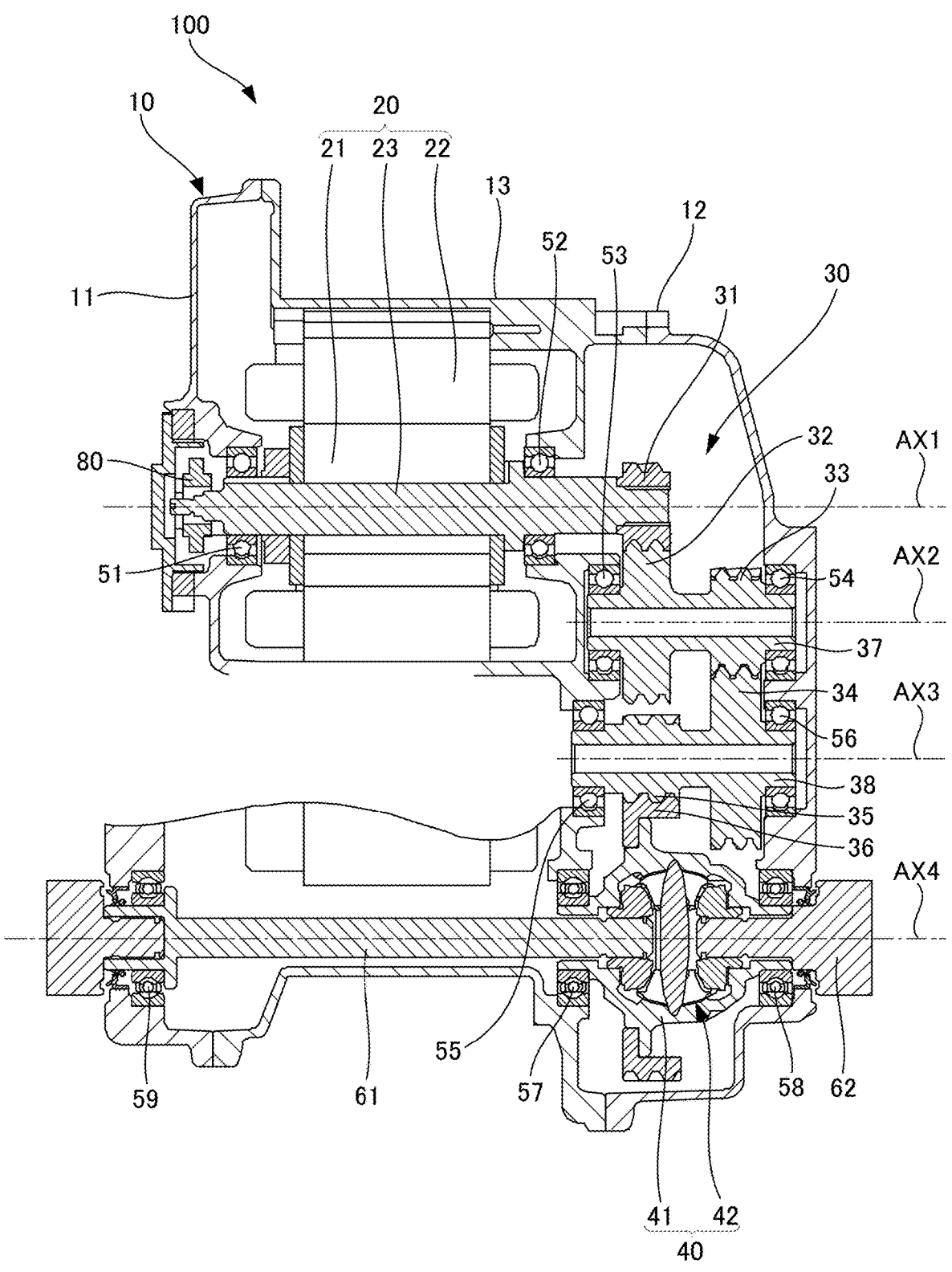
FIG. 1 is a schematic configuration diagram of a unit according to the present embodiment.
Figure 2:
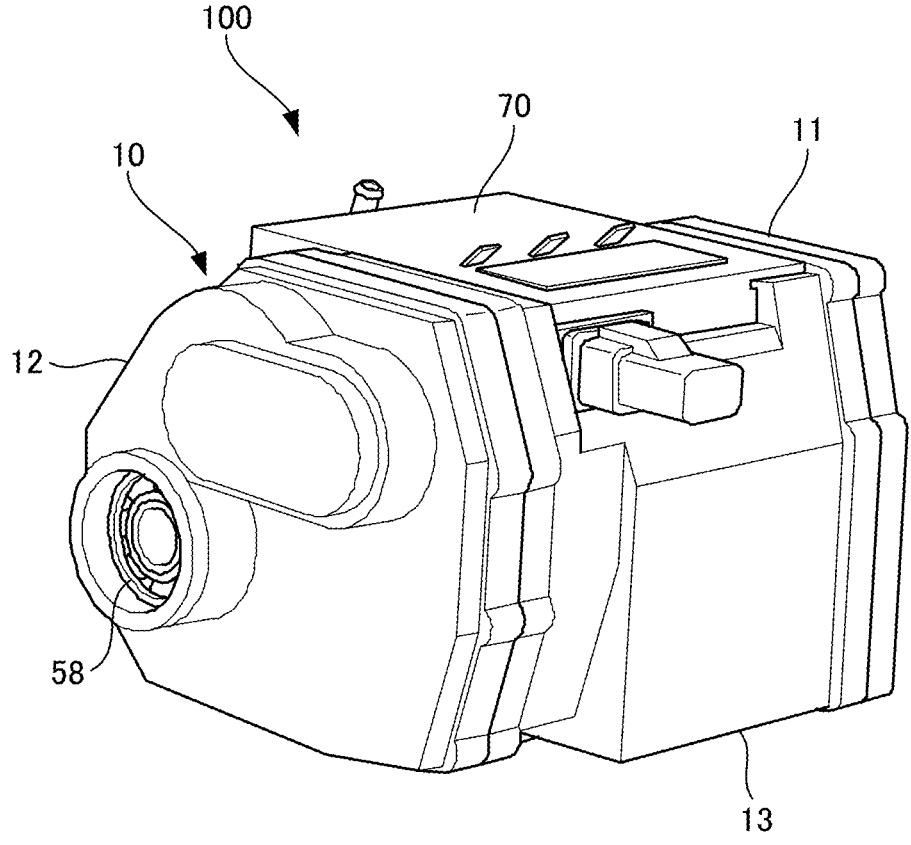
FIG. 2 is an external diagram of the unit.
Figure 3:
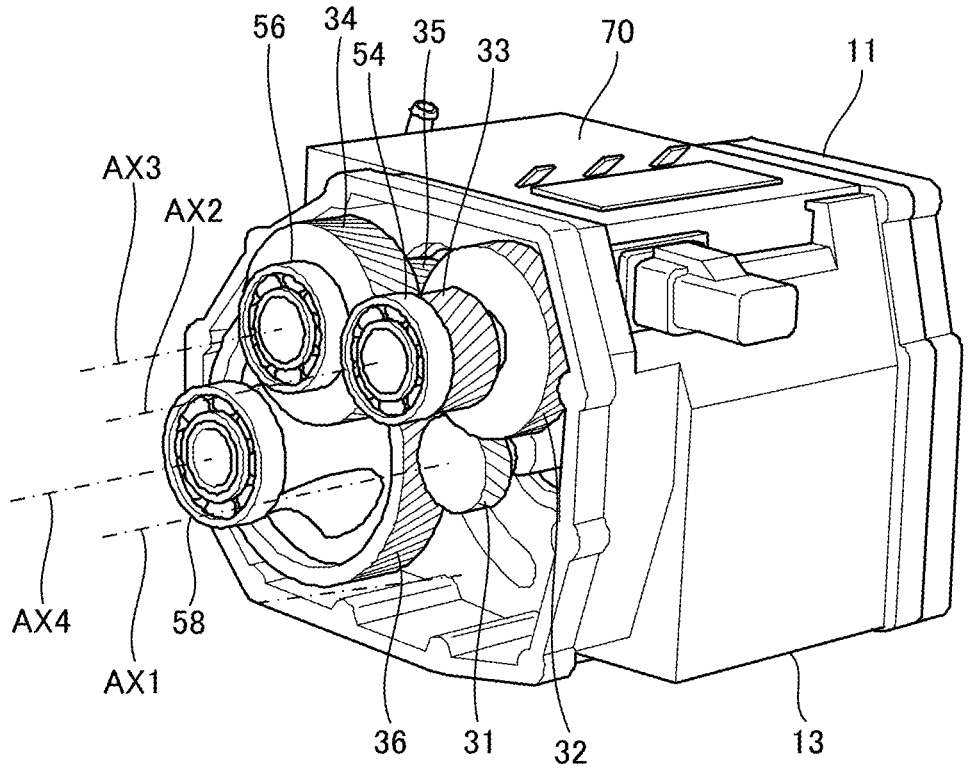
FIG. 3 is an external diagram of the unit with a second cover removed.
Figure 4:
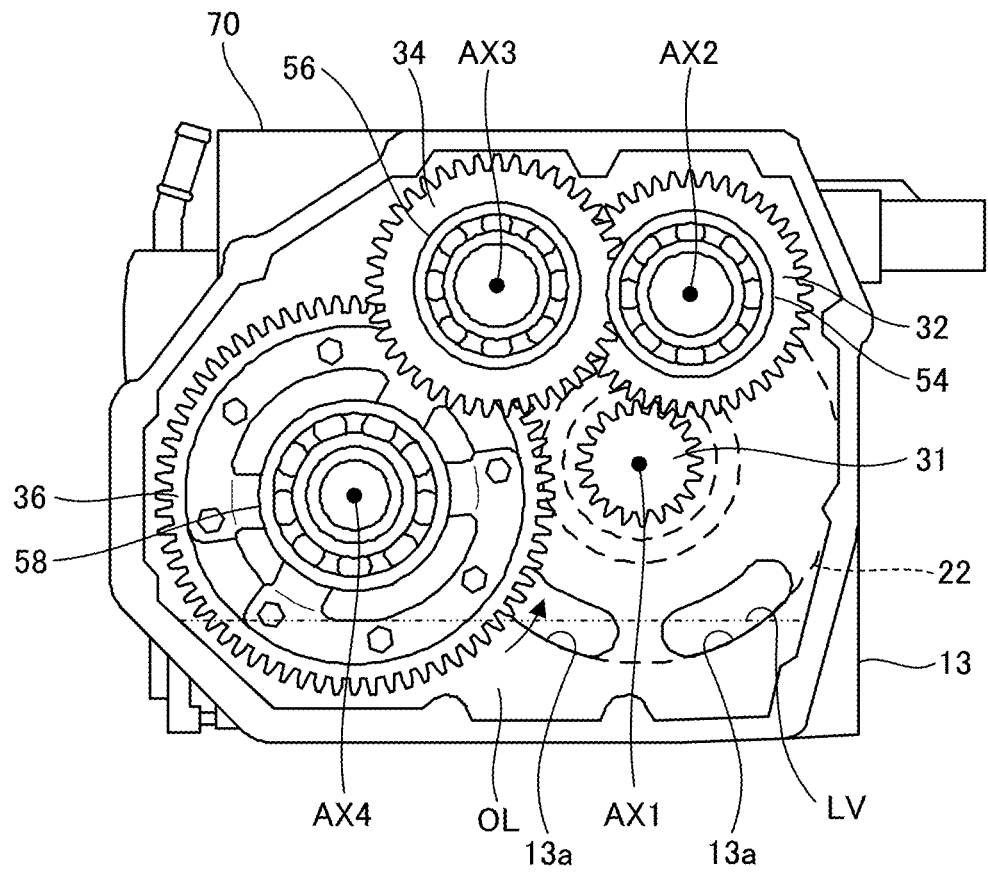
FIG. 4 is a diagram of the unit with the second cover removed as viewed from a reduction mechanism side.

FIG. 1 is a schematic configuration diagram of a unit 100 according to the present embodiment. FIG. 2 is an external diagram of the unit 100. FIG. 3 is an external diagram of the unit 100 with a second cover 12 removed. FIG. 4 is a diagram of the unit 100 with the second cover 12 removed as viewed from a reduction mechanism 30 side. In FIG. 1, a direction perpendicular to the paper surface corresponds to a direction of gravity. In each of FIG. 2 to FIG. 4, an up-down direction corresponds to the direction of gravity.

Regarding the term of unit, the unit can also be referred to as, for example, a motor unit (a unit having at least a motor) or a power transmission device (a device having at least a power transmission mechanism). The motor is a rotating electric machine having an electric motor function and/or a generator function (at least one of the electric motor function and the generator function). The power transmission mechanism is, for example, a gear mechanism and/or a differential gear mechanism. A device (unit) including the motor and the power transmission mechanism is included in concepts of both the motor unit and the power transmission device.

As shown in FIG. 1, the unit 100 includes a housing 10, a rotating electric machine 20, a reduction mechanism 30, and a differential gear 40. The unit 100 is mounted on a vehicle, which is an electric vehicle. The housing 10 includes a first cover 11, the second cover 12, and a case 13. The rotating electric machine 20, the reduction mechanism 30, and the differential gear 40 are housed in the housing 10. The first cover 11 closes an opening of the cylindrical case 13 from one side in an axial direction (left side in FIG. 1), and the second cover 12 closes an opening of the case 13 from the other side in an axial direction. The rotating electric machine 20 is housed in the case 13, and the differential gear 40 is housed in the second cover 12.

As shown in FIG. 2 to FIG. 4, the unit 100 further includes an inverter 70. The inverter 70 is provided on an outer wall of the case 13. The inverter 70 may be provided inside the case 13. The inverter 70 is provided close to the rotating electric machine 20. The inverter 70 is provided above the rotating electric machine 20. The terms "above" and "below" refer to disposing that appears to overlap in the direction of gravity when viewed in a predetermined direction including the axial direction and a radial direction. For example, when a first element overlaps a second element in the direction of gravity when viewed in the axial direction, if a position of the first element is higher than that of the second element, the first element is above the second element. In this case, the first element and the second element may overlap each other or be offset when viewed in the radial direction.

The unit 100 has oil OL. The oil OL is supplied to the rotating electric machine 20 in the case 13 from the outside of the housing 10 to lubricate the rotating electric machine 20, for example. A part of the oil OL supplied to the rotating electric machine 20 is stored in the housing 10 and housed in the housing 10. The remaining oil OL is discharged to the outside of the housing 10. The oil OL can be used by being circulated inside and outside the housing 10.

The case 13 has through holes 13a. The through holes 13a are formed in the case 13 in portions below a first axis AX1 and a fourth axis AX4 in the direction of gravity, and allow the inside of the second cover 12 to communicate with the inside of the case 13. Therefore, the oil OL in the case 13 can flow into the second cover 12 through the through holes 13a, and is also used to lubricate the differential gear 40. An oil reservoir is formed inside each of the second cover 12 and the case 13 at a portion in the lower side in the direction of gravity. In a steady circulation state, an oil level LV of the oil reservoir overlaps the through hole 13a, for example, when viewed in the axial direction, and thus, in the steady circulation state, the oil reservoir in the second cover 12 and the oil reservoir in the case 13 has a common height of an oil surface.

The steady circulation state is a state in which the oil OL is circulating steadily. For example, when oil circulation is performed using a pump, the steady circulation state is a state in which the oil level LV is stable during the pump operation. The oil circulation may be performed by a rotating member such as a gear in the housing 10 scooping up the oil OL. In this case, the steady circulation state is a state in which the oil level LV is stable during rotation of the rotating member.

The oil level LV is set to a height at which a stator 22 is immersed in the oil OL in the steady circulation state, and the oil OL does not enter a gap (air gap) between a rotor 21 and the stator 22. This is because, when the oil OL enters the air gap, a rotation resistance of the rotating electric machine 20 increases rapidly, while the stator 22 is desired to be cooled. Therefore, the oil level LV is set as described above, so that the oil OL comes into contact with a coil end of the stator 22.

Returning to FIG. 1, the rotating electric machine 20 includes the rotor 21, the stator 22, and a rotating shaft 23, and constitutes a drive source for a vehicle. The rotor 21 is provided on the outer periphery of the rotating shaft 23. The stator 22 is provided to the case 13 and houses the rotor 21. The rotating shaft 23 protrudes from the rotor 21 toward both sides in the axial direction. The rotating shaft 23 penetrates the first cover 11 at one end side in an axial direction and penetrates the case 13 at the other end side in an axial direction. A bearing 51 is provided on the first cover 11 at a portion through which the rotating shaft 23 penetrates, and a bearing 52 is provided on the case 13 at a portion through which the rotating shaft 23 penetrates, and the rotating shaft 23 is supported by the bearing 51 and the bearing 52. A resolver 80 is provided on the rotating shaft 23 at a portion protruding from the first cover 11. The resolver 80 detects the rotation of the rotating electric machine 20.

The reduction mechanism 30 is a gear mechanism, and includes a first gear 31, a second gear 32, a third gear 33, a fourth gear 34, a fifth gear 35, a sixth gear 36, a shaft 37, and a shaft 38. The first gear 31 and the rotating electric machine 20 are disposed on the first axis AX1. In other words, the rotating electric machine 20 and the first gear 31 are disposed coaxially with respect to the first axis AX1. In other words, a plurality of elements (components, portions, and the like) disposed on an N-th axis (N is a natural number) is synonymous with the plurality of elements disposed coaxially with respect to the N-th axis. Similarly, the second gear 32 and the third gear 33 are disposed on a second axis AX2, and the fourth gear 34 and the fifth gear 35 are disposed on a third axis AX3. The sixth gear 36 and the differential gear 40 are disposed on the fourth axis.

The first axis AX1, the second axis AX2, the third axis AX3, and the fourth axis AX4 all constitute axes of the unit 100 and extend in the same direction. Therefore, the extension directions of the first axis AX1, the second axis AX2, the third axis AX3, and the fourth axis AX4 all correspond to the axial direction of the unit 100. That is, the axial direction means an axial direction of the rotating shaft of components (for example, the motor, the gear mechanism, and the differential gear mechanism) that constitute the unit. The radial direction of the unit 100 is a direction perpendicular to any of the first axis AX1, the second axis AX2, the third axis AX3, and the fourth axis AX4. The first axis AX1 constitutes an axis of the rotating shaft 23, the second axis AX2 constitutes an axis of the shaft 37, the third axis AX3 constitutes an axis of the shaft 38, and a fourth axis AX4 constitutes an axis of the differential gear 40.

The first gear 31 is connected downstream of the rotating electric machine 20. The downstream is a power output side, and the rotor 21 and the stator 22 that generate power are used as references for the rotating electric machine 20. Therefore, the downstream of the rotating electric machine 20 can be said to be the downstream of the stator 22. Alternatively, the rotating shaft 23 does not need to be understood as a component of the rotating electric machine 20 in terms of a positional relationship in power transmission. The downstream is the power output side, whereas the upstream is a power input side.

The first gear 31 is connected downstream of the rotating electric machine 20 so as to be capable of transmitting power. The connection may be made via other configurations (for example, a clutch or other gear mechanisms). The first gear 31 is provided at the other side in the axial direction of the rotor 21 and is provided at the rotating shaft 23 at a portion protruding from the case 13. The first gear 31 is press-fitted into the rotating shaft 23 and is integrated with the first gear 31.

The second gear 32 meshes with the first gear 31. The second gear 32 is set to have a larger number of teeth than that of the first gear 31, and constitutes a first reduction gear stage together with the first gear 31. The second gear 32 is provided at the shaft 37 and is disposed on the second axis AX2. The second gear 32 is formed integrally with the shaft 37. The shaft 37 extends along the rotating shaft 23. The shaft 37 is supported by a bearing 53 provided at the case 13 and a bearing 54 provided at the second cover 12. The bearing 53 and the bearing 54 are disposed at both ends of the shaft 37.

The third gear 33 is connected downstream of the second gear 32. The third gear 33 is provided at the shaft 37 and disposed on the second axis AX2. The third gear 33 is provided at the shaft 37 at a portion extending in a direction away from the rotating electric machine 20 than the second gear 32, that is, extending on the other side in the axial direction. The third gear 33 is integrally formed at the shaft 37. The second gear 32 and the third gear 33 are disposed between the bearing 53 and the bearing 54 in the axial direction.

The fourth gear 34 meshes with the third gear 33. The fourth gear 34 is set to have a larger number of teeth than that of the third gear 33, and constitutes a second reduction gear stage together with the third gear 33. The fourth gear 34 is provided at the shaft 38 and disposed on the third axis AX3. The fourth gear 34 is integrally formed at the shaft 38. The shaft 38 extends along the rotating shaft 23. The shaft 38 is supported by a bearing 55 provided at the case 13 and a bearing 56 provided at the second cover 12. The bearing 55 and the bearing 56 are disposed at both ends of the shaft 38.

The fifth gear 35 is connected downstream of the fourth gear 34. The fifth gear 35 is provided at the shaft 38 and disposed on the third axis AX3. The fifth gear 35 is provided at the shaft 38 at a portion extending in a direction closer to the rotating electric machine 20 than the fourth gear 34, that is, extending on the one side in the axial direction. Therefore, a power transmission direction of the shaft 38 is turned back to an opposite side in the axial direction as compared with the shaft 37. The fifth gear 35 is formed integrally with the shaft 38. The fourth gear 34 and the fifth gear 35 are disposed between the bearing 55 and the bearing 56 in the axial direction.

The sixth gear 36 meshes with the fifth gear 35. The sixth gear 36 is a final gear and is provided on the differential gear 40. The sixth gear 36 and the differential gear 40 are disposed on the fourth axis AX4. The power from the rotating electric machine 20 is transmitted from the sixth gear 36 to the differential gear 40. Therefore, the differential gear 40 is connected downstream of the sixth gear 36.

The sixth gear 36 overlaps the first gear 31 when viewed in the radial direction. In other words, the first gear 31 has a portion that overlaps the sixth gear 36 when viewed in the radial direction. For example, the portion overlaps the sixth gear 36 when viewed in the radial direction along a plane including the first axis AX1 and the fourth axis AX4. The expression "overlap when viewed in a predetermined direction including a radial direction and an axial direction" means overlapping in the predetermined direction, and means that a plurality of elements are disposed in the predetermined direction. Therefore, when the plurality of elements are disposed in the predetermined direction in the drawings, it may be assumed that the specification contains a sentence illustrating that a plurality of elements overlap when viewed in the predetermined direction.

In a case where the sixth gear 36 overlaps the first gear 31 when viewed in the radial direction, the power transmission direction is turned back to the opposite side in the axial direction with respect to the shaft 37 by the shaft 38 as described above. Therefore, in the case where the sixth gear 36 overlaps the first gear 31 when viewed in the radial direction, a dimension in the axial direction is reduced.

The sixth gear 36 is set to have a larger number of teeth than that of the fifth gear 35, and constitutes a third reduction gear stage together with the fifth gear 35. Therefore, in the reduction mechanism 30, the first gear 31 and the second gear 32, the third gear 33 and the fourth gear 34, and the fifth gear 35 and the sixth gear 36 perform three-stage reduction. Accordingly, in order to ensure a reduction ratio, a reduction gear diameter can be made smaller than that in a case of one-stage reduction or even two-stage reduction. As a result, layout constraints such as limitations on compactness of the unit 100 due to necessity of ensuring an inter-axis distance corresponding to a large reduction gear diameter are alleviated.

That is, in the unit 100, three gear stages can be formed by four axes, that is, the first axis AX1 to the fourth axis AX4, and the number of gear stages can be increased as compared with the case of one-stage shifting or two-stage shifting. By increasing the number of gear stages, the diameter of each gear can be made smaller to achieve a predetermined gear ratio. As a result, a factor of layout constraints caused by excessively large gears can be alleviated. Therefore, layout properties of the unit 100 can be improved.

In the reduction mechanism 30, the third gear 33 and the fourth gear 34 are disposed in a direction away from the stator 22 than the first gear 31, the second gear 32, the fifth gear 35, and the sixth gear 36. That is, the four gears, that is, the first gear 31, the second gear 32, the fifth gear 35, and the sixth gear 36, are moved toward the stator 22, and the remaining two gears, that is, the third gear 33 and the fourth gear 34, are moved away from the stator 22. Accordingly, a space is formed around the above two gears, that is, on an end side of the unit 100. Therefore, an end of the unit 100 can be recessed to reduce the size, or components can be placed in the space on the end side of the unit 100, thereby increasing a freedom of layout.

The differential gear 40 is a differential gear mechanism, and includes a differential case 41 and a differential portion 42. The differential case 41 is supported by a bearing 57 provided at the case 13 and a bearing 58 provided at the second cover 12, and rotates together with the sixth gear 36. The sixth gear 36 is coaxially fixed to an outer wall of the differential case 41, and the differential case 41 houses the differential portion 42. The differential portion 42 distributes and outputs, to drive wheels in a left-right direction of the vehicle, the power input to the differential case 41 via the sixth gear 36.

The differential gear 40 protrudes in a direction away from the stator 22 with respect to the sixth gear 36. The differential gear 40 protrudes in this manner with a portion that protrudes more in the axial direction from the sixth gear 36 as a protruding portion. In other words, the differential gear 40 protrudes more in the direction away from the stator 22 than in the direction close to the stator 22 with respect to the sixth gear 36, and is disposed in the direction away from the stator 22 with respect to the sixth gear 36.

Accordingly, the differential gear 40 is disposed in a space on the end side of the unit 100 formed according to the gear disposing of the reduction mechanism 30. Therefore, as described above, the reduction in the dimension of the reduction mechanism 30 in the axial direction and the reduction in the gear diameter due to adoption of three-stage reduction allow the unit 100 to be made compact suitably. As a result, the layout properties of the unit 100 are further improved.

The bearing 57 and the bearing 58 are disposed on both sides in the axial direction with respect to the differential gear 40. As a result, the bearing 53, the bearing 55, and the bearing 57 are disposed on the one side in the axial direction, and the bearing 54, the bearing 56, and the bearing 58 are disposed on the other side in the axial direction with respect to each gear of the reduction mechanism 30 and the differential gear 40. Therefore, rigidity of the housing 10 can be ensured easily, which is advantageous in terms of sound and vibration performance. In addition, since bearing retaining holes can be machined together on the one side in the axial direction and on the other side in the axial direction, it becomes easier to align centers between the three rotating members, that is, the shaft 37, the shaft 38, and the differential gear 40. Furthermore, since each gear of the reduction mechanism 30 and the bearings 53 to 58 are disposed together on the other side in the axial direction with respect to the stator 22, it becomes easier to dispose the resolver 80 from the one side in the axial direction with respect to the rotating shaft 23, and the rotating electric machine 20 can be easily assembled.

A first drive shaft 61 is attached to the differential portion 42 from the one side in the axial direction, and a second drive shaft 62 is attached to the differential portion 42 from the other side in the axial direction. The power from the rotating electric machine 20 is transmitted from the differential portion 42 to one drive wheel via the first drive shaft 61, and to the other drive wheel via the second drive shaft

62. The first drive shaft 61 is longer than the second drive shaft 62, so that a distance between the drive wheel and the differential gear 40 is increased, thereby limiting a bending angle. The first drive shaft 61 is supported by a bearing 59 provided at the first cover 11.

The sixth gear 36 may be understood as a part of the differential gear 40. That is, the sixth gear 36 may be understood as one component of the differential gear 40. Also in this case, it can be understood that the differential gear 40 including the differential portion 42 that outputs the power from the rotating electric machine 20 is connected downstream of the sixth gear 36 in such a manner that a part of the differential gear 40 is connected downstream of the sixth gear 36.

As shown in FIG. 3 and FIG. 4, the first axis AX1 and the fourth axis AX4 are disposed at a lower side of the second axis AX2 and the third axis AX3 when viewed in the axial direction. An upper side and the lower side refer to an up-down relationship in the direction of gravity when viewed in the predetermined direction including the axial direction and the radial direction, and include the "above" and "below". Regarding the "above" and "below", the upper side and the lower side further include a positional relationship of being obliquely above and below when viewed in the predetermined direction including the axial direction and the radial direction. Therefore, for example, when the first element is located obliquely above the second element without overlapping the second element in the direction of gravity when viewed in the axial direction, and the first element and the second element do not overlap when viewed in the radial direction, the first element is located at the upper side of the second element.

As a result of being disposed as described above, a layout in which the first axis AX1 and the fourth axis AX4 are disposed in a manner of being concentrated on the lower side of the unit 100 in the direction of gravity is achieved. Accordingly, the oil OL scattered by the rotation of the sixth gear 36, which is the downstream gear, is easily guided to the rotating electric machine 20, resulting in a layout that allows for appropriate oil lubrication. The oil OL can be guided to the rotating electric machine 20 through the through holes 13a as shown by an arrow in FIG. 4.

Since the rotating electric machine 20 disposed on the first axis AX1 is disposed on the lower side in the direction of gravity, it is possible to provide a space above the rotating electric machine 20. Therefore, it is possible to dispose the inverter 70 above the rotating electric machine 20 and bring the inverter 70 close to the rotating electric machine 20 while preventing the dimension in the radial direction from increasing. As a result, the unit 100 is more compact than that in a case where the rotating electric machine 20 is disposed on the upper side in the direction of gravity and the inverter 70 is further disposed above the rotating electric machine 20, and the layout properties of the unit 100 are improved.

Furthermore, if the rotating electric machine 20 is disposed on the upper side in the direction of gravity, and the inverter 70, which is a high-voltage component, is disposed below the rotating electric machine 20, there is a concern that a leakage current due to damage may occur, but such a concern does not exist in the unit 100. A leakage current due to damage may occur, for example, when the inverter 70 is crushed by a heavy object including the rotating electric machine 20 during a vehicle collision, or when an impact load is applied to the inverter 70 when the bottom of the vehicle is hit.

In the unit 100, the gear diameter is reduced by adopting the three-stage reduction as described above, and as a result, the layout restrictions are alleviated. Therefore, a relative height of an oil surface of the oil reservoir for each of the rotating electric machine 20 and the differential gear 40 can be easily set appropriately by respectively disposing the rotating electric machine 20 and the differential gear 40.

In this case, the height of the oil surface can be set more appropriately for the differential gear 40 by relatively raising the height of the oil surface of the oil reservoir in the second cover 12 (thus lowering a position of the differential gear 40). In addition, the height of the oil surface can be set more appropriately for the rotating electric machine 20 by relatively lowering the height of the oil surface of the oil reservoir in the case 13 (thus raising a position of the rotating electric machine 20) in order to prevent the oil OL from penetrating the air gap between the rotor 21 and the stator 22. From this perspective, in the unit 100, the first axis AX1 is disposed at an upper side of the fourth axis AX4.

Next, main functions and effects of the present embodiment will be described.

(1) The unit 100 includes the housing 10 that houses the oil OL, the rotating electric machine 20, the first gear 31 connected downstream of the rotating electric machine 20, the second gear 32 meshing with the first gear 31, the third gear 33 connected downstream of the second gear 32, the fourth gear 34 meshing with the third gear 33, the fifth gear 35 connected downstream of the fourth gear 34, and the sixth gear 36 meshing with the fifth gear 35. The rotating electric machine 20 and the first gear 31 are disposed on the first axis AX1. The second gear 32 and the third gear 33 are disposed on the second axis AX2. The fourth gear 34 and the fifth gear 35 are disposed on the third axis AX3. The sixth gear 36 is disposed on the fourth axis AX4. When viewed in the axial direction, the first axis AX1 and the fourth axis AX4 are disposed in the lower side of the second axis AX2 and the third axis AX3.

According to such a configuration, by increasing the number of gear stages, a diameter of each gear can be made smaller to achieve a predetermined gear ratio. As a result, a factor of layout constraints caused by excessively large gears can be alleviated. Therefore, layout properties of the unit 100 can be improved. In addition, by concentrating the first axis AX1 and the fourth axis AX4 on the lower side in the direction of gravity, it becomes easier to guide the oil OL scattered by rotation of the sixth gear 36, which is a gear on the downstream side, to the rotating electric machine 20 as described above. Therefore, a layout that allows for appropriate oil lubrication is achieved.

In this case, the layout properties of the unit 100 can also be improved by making the unit 100 compact as described above. Also in this case, there is no concern of a leakage current due to damage to the inverter 70 as described above, and the relative height of the oil surface of the oil reservoir for each of the rotating electric machine 20 and the differential gear 40 can be easily set appropriately.

(2) In the unit 100, the first gear 31 has a portion overlapping the sixth gear 36 when viewed in the radial direction. According to such a configuration, the dimension in the axial direction can be shortened as compared with that in a case where the differential gear 40 is disposed in an inverted manner in the axial direction with respect to the third gear 33 and the fourth gear 34, which contributes to shortening the dimension in the axial direction.

(3) In the unit 100, the third gear 33 and the fourth gear 34 are disposed in the direction away from the stator 22 than the first gear 31, the second gear 32, the fifth gear 35, and the sixth gear 36. Accordingly, a space is formed around the third gear 33 and the fourth gear 34, that is, on the end side of the unit 100. Therefore, the end side of the unit 100 can be recessed to reduce the size, or other components can be placed in the space on the end side of the unit 100, thereby increasing a freedom of layout.

(4) The unit 100 includes the differential gear 40 connected downstream of the sixth gear 36. The differential gear 40 is disposed on the fourth axis AX4. The differential gear 40 protrudes in the direction away from the stator 22 with respect to the sixth gear 36. According to such a configuration, the differential gear 40 is disposed in the space on the end side of the unit 100, and thus the unit 100 can be suitably made compact, and the degree of freedom in layout can be further increased.

Although the embodiment of the present invention has been described above, the above embodiment merely exemplifies some of application examples of the present invention and does not intend to limit the technical scope of the present invention to the specific configurations of the above embodiment.

The present application claims a priority based on Japanese Patent Application No. 2022-095081 filed with the Japan Patent Office on Jun. 13, 2022, all the contents of which are hereby incorporated by reference.

DESCRIPTION OF REFERENCE SIGNS 10 housing
20 rotating electric machine
21 rotor
22 stator
23 rotating shaft
30 reduction mechanism
31 first gear
32 second gear
33 third gear
34 fourth gear
35 fifth gear
36 sixth gear
40 differential gear
70 inverter
100 unit
AX1 first axis
AX2 second axis
AX3 third axis
AX4 fourth axis

The invention claimed is:
1. A unit, comprising:
a housing configured to house oil, a rotating electric machine, a first gear connected downstream of the rotating electric machine, a second gear meshing with the first gear, a third gear connected downstream of the second gear, a fourth gear meshing with the third gear, a fifth gear connected downstream of the fourth gear, and a sixth gear meshing with the fifth gear, wherein
the rotating electric machine and the first gear are disposed on a first axis,
the second gear and the third gear are disposed on a second axis,
the fourth gear and the fifth gear are disposed on a third axis,
the sixth gear is disposed on a fourth axis,
when viewed in an axial direction, the first axis and the fourth axis are disposed at a lower side of the second axis and the third axis,
the oil scattered by rotation of the sixth gear is guided to a rotating electric machine side through a through hole provided in a portion of the housing disposed on a first gear side as viewed from the rotating electric machine, and
the through hole is provided in a lower side of the fourth axis in a direction of gravity.
2. The unit according to claim 1, wherein
when viewed in a radial direction, the first gear has a portion that overlaps the sixth gear.
3. The unit according to claim 2, wherein
the third gear and the fourth gear are disposed in a direction away from a stator of the rotating electric machine than the first gear, the second gear, the fifth gear, and the sixth gear.
4. The unit according to claim 3, further comprising:
a differential gear connected downstream of the sixth gear, wherein
the differential gear is disposed on the fourth axis, and
the differential gear protrudes in the direction away from the stator with respect to the sixth gear.
5. The unit according to claim 1, wherein
the third gear and the fourth gear are disposed in a direction away from a stator of the rotating electric machine than the first gear, the second gear, the fifth gear, and the sixth gear.
6. The unit according to claim 5, further comprising:
a differential gear connected downstream of the sixth gear, wherein
the differential gear is disposed on the fourth axis, and
the differential gear protrudes in the direction away from the stator with respect to the sixth gear.
7. The unit according to claim 1, wherein
when viewed in the axial direction, the first axis is disposed at an upper side of the fourth axis.
8. The unit according to claim 1, wherein
an oil reservoir formed by the oil has a portion overlapping the through hole when viewed in the axial direction and a portion not overlapping the through hole when viewed in the axial direction.

* * * * *